March 13, 1956     T. W. MERRITT ET AL     2,737,924
MILKING APPARATUS
Filed March 23, 1951                                4 Sheets-Sheet 1
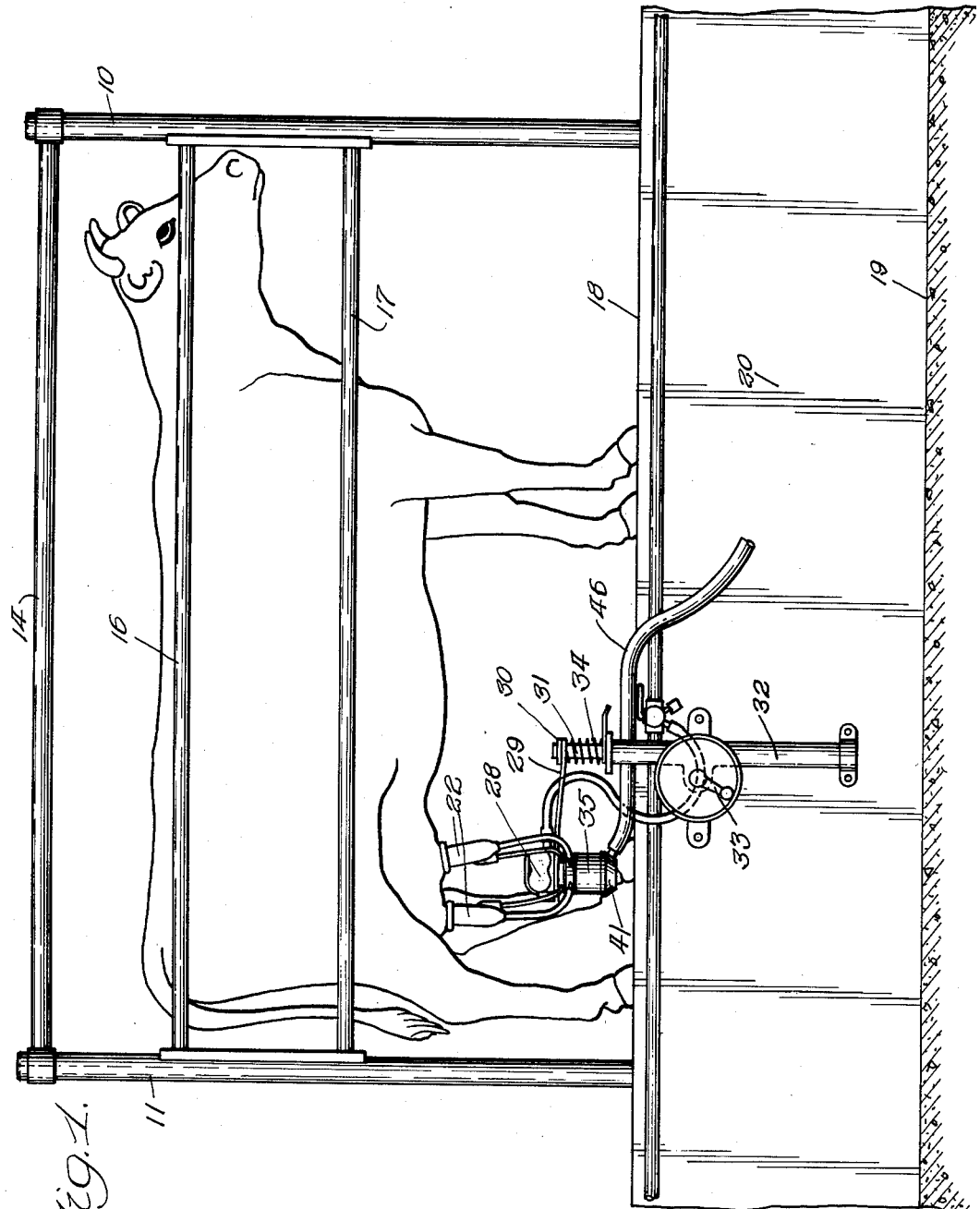

March 13, 1956    T. W. MERRITT ET AL    2,737,924
MILKING APPARATUS
Filed March 23, 1951          4 Sheets-Sheet 2
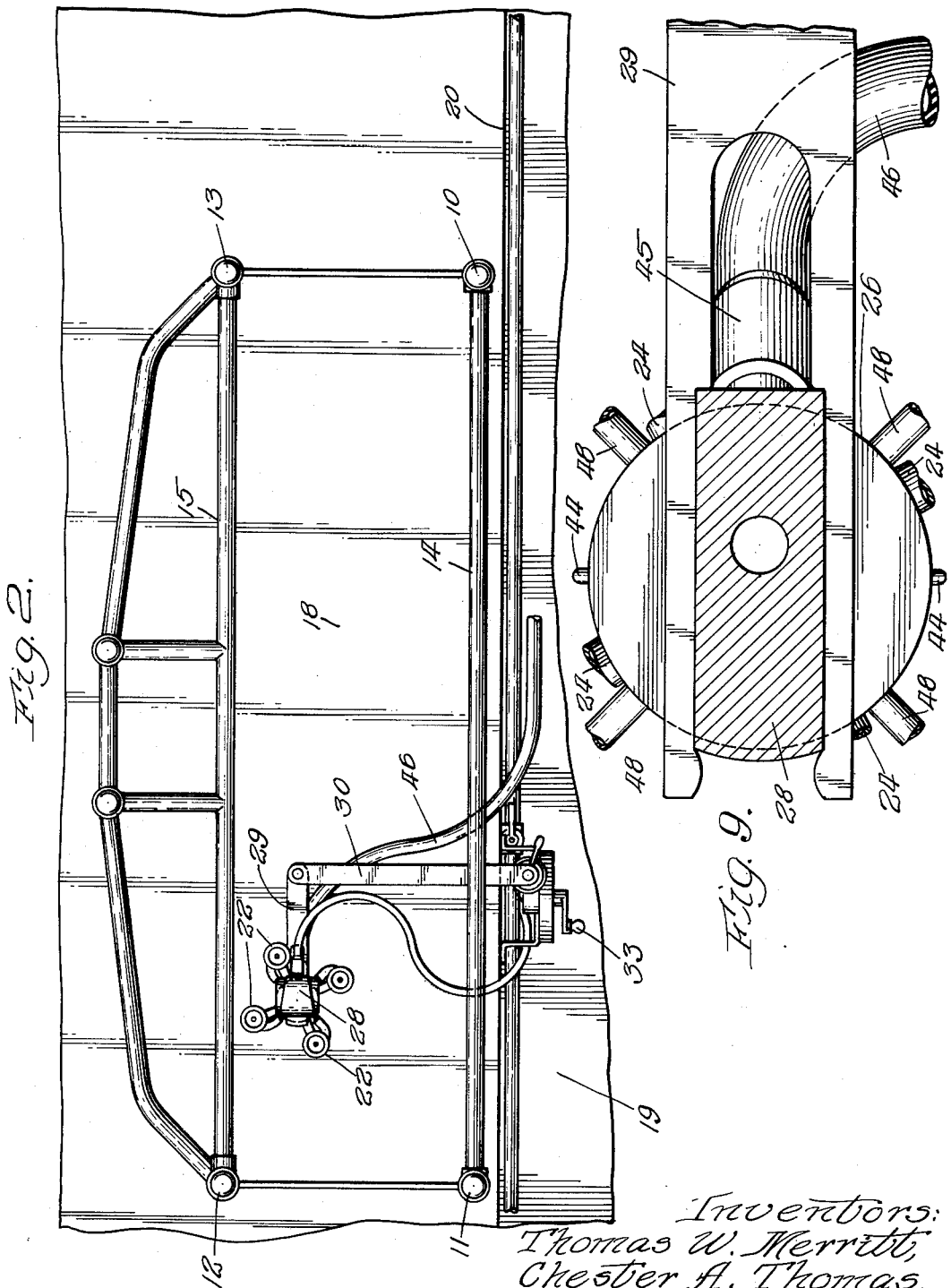
Inventors:
Thomas W. Merritt,
Chester A. Thomas,
Warren C. Babb,
By Schroeder, Merriam,
Hofgren & Brady, Attys.

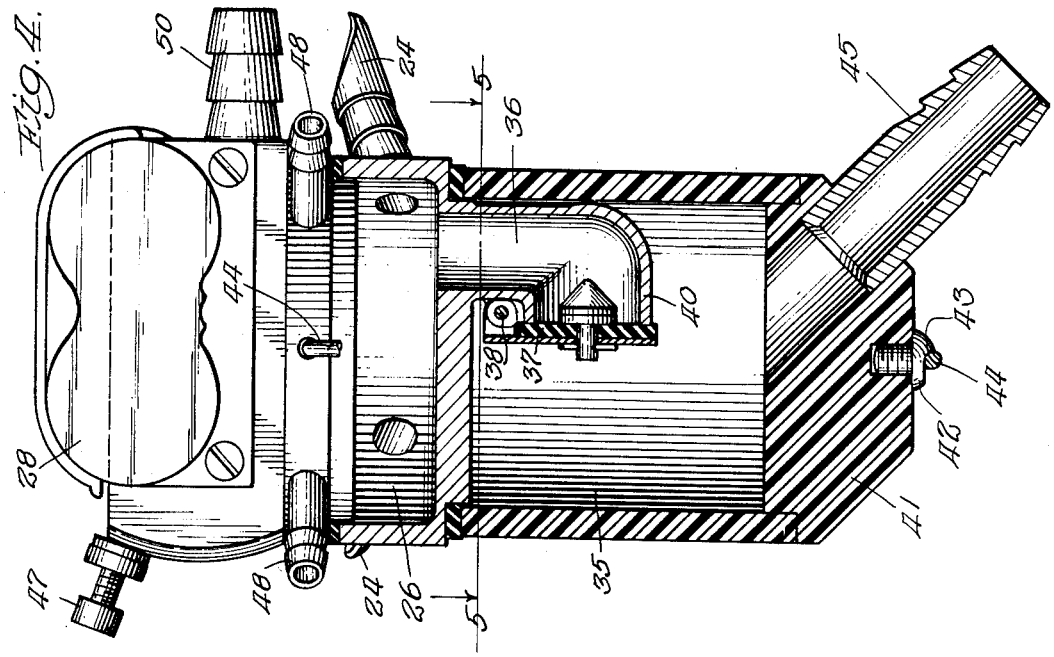
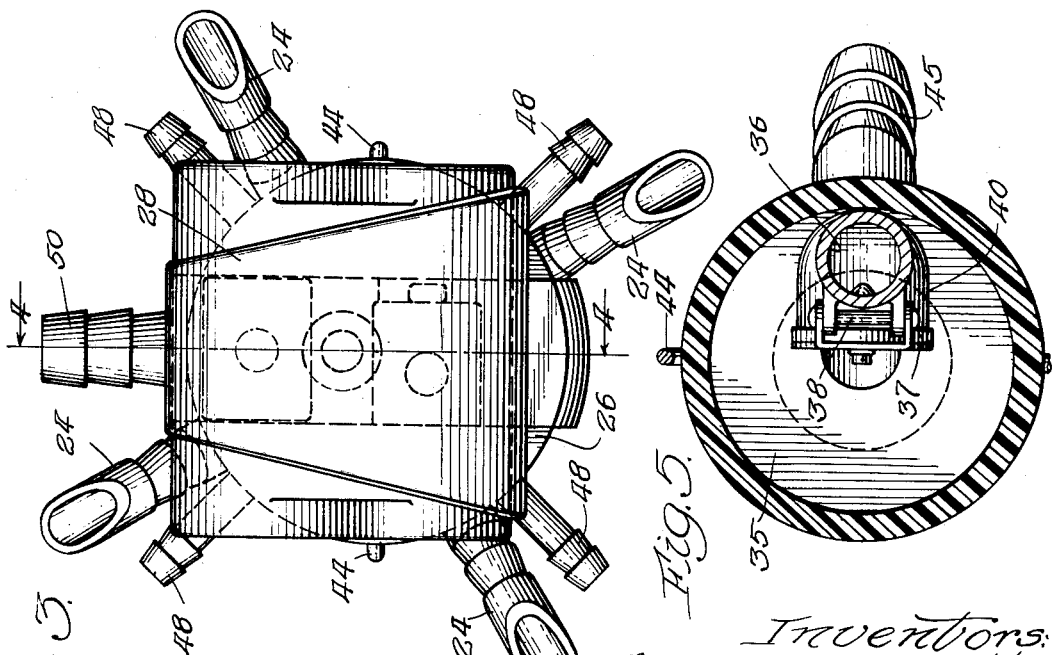

March 13, 1956    T. W. MERRITT ET AL    2,737,924
MILKING APPARATUS
Filed March 23, 1951      4 Sheets-Sheet 4
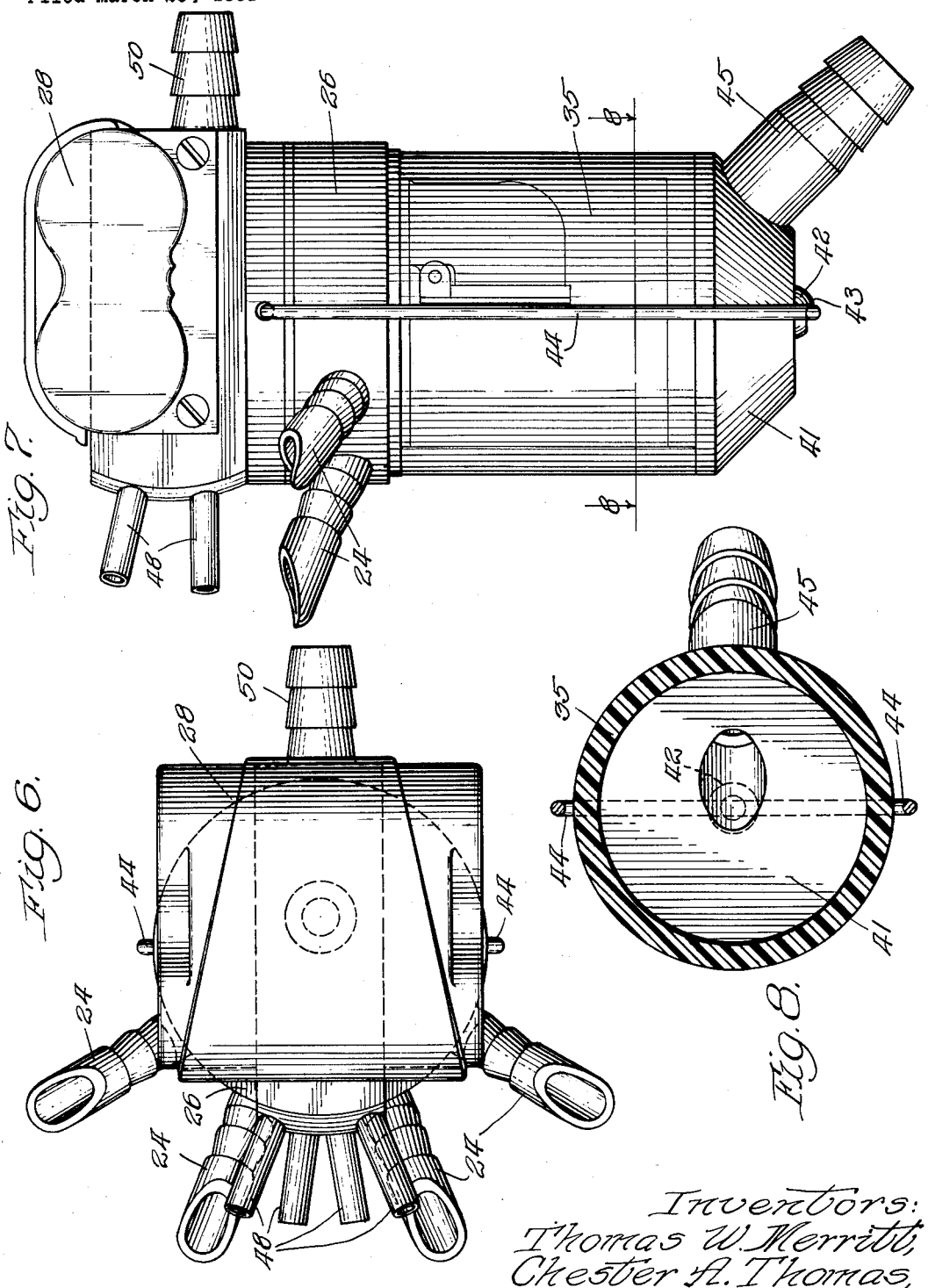
Inventors:
Thomas W. Merritt,
Chester A. Thomas,
Warren C. Babb,
By Schroeder, Merriam,
Hogren & Brady, Attys.

United States Patent Office 2,737,924
Patented Mar. 13, 1956

2,737,924

MILKING APPARATUS

Thomas W. Merritt, St. Charles, Chester A. Thomas, Lake Forest, and Warren C. Babb, Fairdale, Ill., assignors to Babson Bros. Co., a corporation of Illinois Application March 23, 1951, Serial No. 217,138

8 Claims. (Cl. 119—14.55)

This invention relates to milking apparatus, especially of the type used in the machine milking of cows. More particularly it relates to a means for milking cows in conjunction with the use of an apparatus adapted to pipe milk directly from a cow to a milk can or any other appropriate milk delivery point.

One feature of this invention is that it provides a milking apparatus which will avoid the backward flow of any milk after it has once left the teats; another feature of the invention is that it provides an apparatus which can operate very satisfactorily with less vacuum than that heretofore normally used; yet another feature of the invention is that the combination of a check valve with a small and properly proportioned chamber improves the vacuum variations and action on the teats during milking; a further feature of the invention is that it provides an apparatus which is light and easy to handle; still another feature of the invention is that it provides a compact milking apparatus which nevertheless enables the operator to observe the progress of the milking operation; and yet a further feature of the invention is that it provides a check valve in the milking passageway which prevents the backward flow of milk around the teats during pulsing intervals.

Other features and advantages of this invention will be apparent from the following specification and the drawings, in which:

Fig. 1 is a view of a cow being milked by an apparatus incorporating this invention;

Fig. 2 is a top plan view of the apparatus of Fig. 1, the cow being omitted;

Fig. 3 is an enlarged plan view of the pulsator and chamber shown in Fig. 2, the teat cup assembly being omitted;

Fig. 4 is a sectional elevation taken along the lines 4—4 of Fig. 3;

Fig. 5 is a sectional view taken along the lines 5—5 of Fig. 4 showing the construction of the check valve;

Fig. 6 is a plan view of a modification of the pulsator and chamber shown in Fig. 3 in which the nipples all extend outward from the same side of the pulsator;

Fig. 7 is a side elevation of the modification shown in Fig. 6 including the bail which clamps the various parts of the apparatus together;

Fig. 8 is a sectional plan view taken along the lines 8—8 of Fig. 7, and

Fig. 9 is a broken sectional view of a holding clamp or forked bar which slides under the shoulder at the bottom of the pulsator to maintain the pulsator assembly in position.

In the particular embodiment of the invention illustrated in Fig. 1, the milking parlor is illustrated as employing the "drop" system, with the cow floor being at a higher level than the operator's floor or alley. Milking parlors of this general type are more fully described in a number of issued patents and reference may be had, for example, to Babson et al. Reissue Patent No. Re. 22,368 and Babson et al. Patent 2,477,035 to supplement the present disclosure with respect to the general features of such milking parlors and stalls. In such milking parlors the cows, after any desired preliminary washing of the udder, or other preparation, are admitted to a stall, as for example the stall shown in Figs. 1 and 2 including the vertical uprights 10, 11, 12 and 13, the overhead horizontal bracing members here identified as 14 and 15, and side horizontal members, as for example, those here identified as 16 and 17. The stall illustrated is shown in simplified form without a feed chute, gate operating equipment, and the like, for convenience and simplicity of illustration. It will be understood that in commercial practice the stall would normally include such additional equipment or accessories as those mentioned above, and others illustrated and described in the above mentioned patents.

In the system illustrated, the cow stands on a floor, here identified as 18, which would be at some suitable higher level (as two feet) above an operator's floor or alley here identified as 19, a vertical wall 20 connecting the two floor levels. While I prefer to have a stepped arrangement of stalls and floors as illustrated in the above mentioned patents, the stall is here shown as parallel to the wall 20 for simplicity of illustration.

The milking apparatus in which the present invention is particularly adapted for use and the apparatus here illustrated and described is of a kind sometimes known in the trade as a "pipe-line" type to distinguish it from a milking machine which receives a given amount of milk directly and which must be emptied after the milking of each cow. The system illustrated here is of a character which can be attached to cows as they move into a stall of a milking parlor and which will deliver milk to a tube or pipe adapted to deliver it to any desired point, either a milk can immediately adjacent the milking stall or at some remote point or through a sanitary pipe line to other apparatus found in the milk houses and dairy installations of the larger dairy farms, as coolers, storage tanks, pasteurizers or the like. The general character and nature of such a system will only be described here to such an extent as is necessary to enable an understanding of the proper relation to the remainder of the system of the particular embodiment of the portion of the system with which this invention is concerned.

In general, as may be seen by reference to Fig. 1, the system includes four teat cup assemblies of identical character, here identified as 22. Each such teat cup assembly comprises a rigid outer shell and a flexible inner element termed an inflation, this inflation comprising a larger generally cylindrical body adapted to receive the teat being milked, and usually including an integral short milk tube extending therefrom and forming a part of the milk passageway delivering milk on through various supplemental parts of the passageway to the desired ultimate destination point. Such teat cup assemblies and inflations are so well known and have been so long used in the field that it is not felt that further illustration or description is necessary. The four teat cup assemblies may be connected together in any desired manner to deliver milk to a single flow passageway, being here shown as having their milk tubes connected to nipples here identified as 24, extending into a small milk receiving chamber here identified as 26. The chamber carries, suitably mounted hereon, a pulsator 28 of a type well known and conventional in the field, and the entire assembly is supported by apparatus including a pair of pivotally interconnected arms 29 and 30 in turn supported on a vertically adjustable post 31.

The particular adjustable supporting arrangement here illustrated is of a type more fully shown and described in Babson et al. Reissue Patent No. Re. 22,368. The post 31 may be vertically adjusted to a desired position by telescopic movement within a tube 32 in turn suitably mounted, this mounting being here illustrated as on the side of the wall of the milking parlor installation, although it will be understood that this is representative only. Adjustment may be effected by the handle 33 through a rack and gear arrangement; and a spring 34 (Fig. 2) is adapted to place continuous forward force on the milking apparatus during milking, so that by appropriate adjustment of the height of the support a downward and forward intermittent tug and pull will be applied to the teat during milking with an intermittent effect due to the pulsator action. The height adjustment is preferably made in such a manner that when the teat cups are placed on the teats there is some upward bending of at least the arm 29, so that the springiness of this arm provides the downward component of force which, together with the forward component of force from the spring 34, provide a steady downward and forward force which is converted into a periodic tug and pull on the teats as a result of pulsator operation and movement of the teat cup assemblies on the teats due to changes in vacuum.

It is desirbale in a pipe line system to have some means to keep the milk moving away from the teats once it has been withdrawn therefrom; and in the first-illustrated embodiment of this invention the chamber 26 and its parts prevent the milk from backing up around the teats.

Referring now more particularly to Figs. 3 to 9, inclusive, the general construction of the chamber 26 and its associated parts will be described in order to bring out the present invention and its relation to the remainder of the milking apparatus illustrated. As best shown in Fig. 4, the nipples 24 to which the teat cup assembly is attached lead to a chamber 26. This chamber 26 is of just sufficient capacity to hold the milk delivered by a single pulse operation of the four teat cups. A larger capacity of the chamber 26 would be undesirable since, as is more fully explained hereafter, a proper proportioning of volume or capacity of the milk passageway between the connector nipples and a check valve, relative to the volume or capacity of the teat cup assemblies, is important to attainment of the advantages of the invention herein disclosed and claimed. However, this chamber may be even smaller in capacity as its function is largely to serve as an intake element to which the teat cup nipples 24 may be attached.

Below the chamber 26 shown in Fig. 4 is another chamber 35, the walls of which are preferably made of a length of transparent plastic tube such as Lucite or Plexiglass. The chamber 35 serves as a means for observing the operation of the apparatus during milking.

The chambers 26 and 35 are connected by a passageway 36 at the bottom of which is a check valve 37. The check valve 37 pivots on a hinge 38 and its weight tends to maintain it seated against the end 40 of the pipe forming the passageway 36.

A base 41 has a boss 42 which has a notch 43 adapted to retain a bail 44 which is pivoted from the pulsator assembly above the chamber 26. The bail 44 may be swung to the left in the view shown in Fig. 7 whereupon the base 41 and the transparent sides of the chamber 35 may be detached. When the bail 44 is in the position shown in Fig. 7, the transparent sides of the chamber 35 are maintained in clamped position between the base 41 and the pulsator assembly. The base 41 also has a nipple 45 extending downward at an angle therefrom. This nipple is adapted to have a combined vacuum line and milk delivery tube 46 attached thereto as shown in Figs. 1 and 2.

The pulsator 28 has a nipple 50 adapted for the attachment of a vacuum line and also a speed control 47 which may be utilized to vary the operating speed of the pulsator. The nipples 24 lead to the interior of the teat cup inflations, being adapted to have the milk tubes connected thereto. For each nipple 24 there is a nipple 48 which is connected to the space between the shell of the teat cup assembly and the inflation inside it. The nipples 48 connect with the pulsator 28 to alternately place a vacuum on the space between the teat cup jackets and the inflations and open this space to the atmosphere.

During milking operations the nipples 45 and 50 are attached to a source of vacuum (not shown). The vacuum on nipple 45 is connected to the interior of the teat cup inflation and is kept constant. However, the vacuum connected through the nipple 50 is converted by the pulsator 28 into a pulsating vacuum which passes through the nipples 48 to the space between the inflations and outer shells of the teat cup assemblies thereby applying alternate pressure to the teats of the cow undergoing milking in a manner simulating the action of a calf. As the nipples 48 are open to the atmosphere the inflations collapse inward around the teat of the cow and provide the "rest" portion of the cycle of operation; and when the inflations are again expanded the vacuum on the interior of the inflation withdraws milk which passes through the nipples 24 and the chamber 26 and through the check valve 37. By locating the check valve 37 in the passageway between the chambers 26 and 35, the applicant has avoided any possible backward flow of milk from the chamber 26 which might otherwise take place when the vacuum around the teats was greater than the vacuum within the chamber 26. This results in a fundamentally different method of operation which will be explained briefly by comparing it with the operation of a standard milking device, in which the milk tubes of an inflation are connected to a small manifold or "claw."

In the standard device there are about 15 inches of vacuum operating on the inflations through the pulsator and there are about 13 inches of vacuum operating on the teats when the inflations are expanded. With a free milk passageway the line vacuum must at all times be at least 13 inches. At the moment the inflations are expanded by the application of 15 inches of vacuum through the pulsator there is a strong tendency for any milk caught in the passageways immediately adjacent the teats to flow backward to fill up the space between the teats and the now expanded inflations.

With the device disclosed herein the check valve prevents any backward flow therethrough. By giving the chamber 26 a volume of the same order as that of the interior of the teat cup inflations the device will operate with a much lower line vacuum on the teats and at the same time the vacuum applied to the teats will be the same as when a standard claw is used. Let it be assumed that the milk line vacuum is only six and a half inches (with pulsator vacuum fifteen inches) and that the chamber 26 contains the same volume of air as that of the inflations after they are expanded. The inflation capacity thus considered is exclusive of the space taken up by the cow's teats. Now assume that the inflations are contracted into a tight fit around the teats, the chamber 26 contains air under a vacuum of six and a half inches (milk line pressure), and that the inflations are then expanded by pulsator operation. Since the check valve immediately closes the only air that has access to the teats is in the chamber 26. Thus, when the inflations begin their expansion the teats are subjected to 6½ inches of vacuum. As the inflations continue their expansion the vacuum about the teats builds up until it reaches a level of the order of 13 inches when the inflations are completely expanded, providing sufficient vacuum at this time to ensure opening of the teat canal sphincter valve and rapid withdrawal of the milk. When the inflations are expanded the check valve remains tightly closed and the milk flowing into chamber 26 decreases the volume available to air in communication with the teats and rapidly reduces the vacuum effective thereon.

At this point the pulsator operates to contract the inflations. The flow of milk stops, if it has not already done so, and the vacuum in the chamber 26 quickly drops to 6½ inches or slightly lower due to the volume of the milk which is present. The check valve 37 opens and the milk in the chamber 26 flows by gravity to the chamber 35. Air under a vacuum of 6½ inches passes upward to the chamber 26 replacing the milk therein. The cycle is now repeated.

From the above description of the operating cycle it may be seen that the vacuum on the cow's teats starts at a low figure and builds up to a maximum which is maintained for but a moment, but at the important instant when the teat valve must be opened; and which immediately returns to a low vacuum level. This slow build-up of vacuum is contrasted with the relatively high vacuum always effective on the teat when heretofore conventional apparatus is used.

The chamber 35 has its sides constructed of transparent material in order to allow for ease of observation. This chamber likewise could be much smaller without interfering with the operation of the apparatus as long as there was still room for the check valve 37. Thus, it may be seen that the passageway 36 with the check valve 37 is one of the important elements in this invention.

The check valve 37 is shown as of the hinged type. It could equally well be of any other standard type known to the art for many years.

While I have shown and described certain embodiments of my invention, it is to be understood that it is capable of many modifications. Changes, therefore, in the construction and arrangement may be made without departing from the spirit and scope of the invention disclosed in the appended claims.

I claim:

1. In a milking system, apparatus of the character described comprising: a teat cup assembly including an inflation; means operatively associated with said assembly for intermittently expanding the inflation; a chamber having a capacity of the same order as the volume of milk delivered by a single pulse of the teat cups, said chamber being in fluid communication with the interior of said inflation and having an outlet; means operatively connected to the outlet of said chamber for applying a continuous vacuum thereto; and a check valve on the outlet side of said chamber, said check valve being constructed and arranged to prevent any backward flow of milk up around the teats whereby expansion of the inflation increases the vacuum in the interior of said inflation.

2. In a milking system, apparatus of the character described comprising: a teat cup assembly including an inflation; means operatively associated with said assembly for intermittently applying vacuum to the exterior of the inflation to expand the same; means defining a passageway connected to the interior of the inflation for conveying milk from said teat cup assembly; means operatively associated with said passageway for continuously applying a relatively low vacuum to said passageway; and a check valve in said passageway at a point near said assembly, said check valve being constructed and arranged to prevent backward flow from said passageway to said assembly whereby expansion of the inflation increases the vacuum in said passageway intermediate the check valve and the inflation.

3. In a milking system, apparatus of the character described comprising: a teat cup assembly including an inflation for each teat cup; means operatively associated with said assembly for intermittently expanding the inflations; a chamber having nipples to which the interior of the inflations of said assembly have fluid communication; means defining a passageway for the withdrawal of milk leading from said chamber; means operatively connected to said passageway for continuously applying vacuum thereto and a check valve hinged at the end of said passageway, said check valve being constructed and arranged to be opened for the passage of milk therethrough from said chamber and to be closed against backward flow therethrough whereby expansion of the inflation increases the vacuum in the interior of said inflation, said check valve being the only valve in said passageway.

4. In a milking system, apparatus of the character described comprising: a teat cup assembly including an inflation for each teat cup; means operatively associated with said assembly for intermittently applying a vacuum to the exterior of the inflations to expand the same; a first chamber having nipples to which the interior of the inflations of said assembly have fluid communication; a second chamber having an unvalved outlet; means defining a passageway for the withdrawal of milk leading from said first chamber to said second chamber; means operatively connected to said second chamber for constantly applying a relatively low vacuum thereto; and a check valve in said passageway, said check valve being constructed and arranged to be opened for the passage of milk therethrough from said chamber and to be closed against backward flow therethrough, thereby preventing backflow of milk around the teats of cows being milked whereby expansion of the inflations increases the vacuum in the interior of said inflations.

5. In a milking system, apparatus of the character described comprising: a teat cup assembly including an inflation for each teat cup; means operatively associated with said assembly for intermittently applying a vacuum to the exterior of the inflations to expand the same; a first chamber in fluid communication with the interior of said inflations whereby milk may be passed from said inflations to said chamber, said chamber having a capacity of the same order as the volume of milk delivered by a single pulse of the teat cups of said assembly; a second chamber having an unvalved outlet; means defining a passageway connected to said chambers for conducting milk from said first chamber to said second chamber; means operatively connected to said second chamber for constantly applying a relatively low vacuum thereto; and a check valve in said passageway whereby expansion of the inflations during the milk delivery portion of a cycle closes the check valve and causes a higher vacuum to exist in the interior of the inflations than exists in said passageway.

6. The method of operating a milking apparatus having a teat cup assembly including a resilient inflation, means defining a milk passageway, and a valve in said passageway, comprising the steps of: continuously evacuating said milk passageway; and alternately expanding and collapsing said inflation, whereby the vacuum within the inflation automatically increases substantially above the vacuum in the milk passageway during the expansion of the inflation.

7. The method of operating a milking apparatus having a teat cup assembly including a resilient inflation, means defining a milk passageway, and a valve in said passageway, comprising the steps of: continuously drawing a relatively low vacuum in said milk passageway; and alternately expanding and collapsing said inflation, whereby said valve automatically closes said milk passageway during expansion of said inflation, increasing the vacuum within the inflation during the expansion thereof.

8. In a milking system, apparatus of the character described comprising: a teat cup assembly including an inflation having a milk tube; means operatively associated with said assembly for intermittently expanding the inflation; a small chamber having said milk tube connected directly thereto to establish fluid communication between the interior of the inflation of said teat cup assembly and the chamber; means operatively connected to said chamber for constantly applying vacuum to said chamber to draw milk therefrom; and only a single check valve in the output side of said chamber, said check valve being constructed and arranged to prevent any backward flow therethrough whereby expansion of the inflation increases the vacuum in the interior of said inflation.

References Cited in the file of this patent

UNITED STATES PATENTS

| | | |
|---|---|---|
| 655,200 | Condron | Aug. 7, 1900 |
| 890,376 | Ridd | June 9, 1908 |
| 1,113,942 | Anderson | Oct. 20, 1914 |
| 1,142,626 | Remy | June 8, 1915 |
| 1,163,161 | Leitch | Dec. 7, 1915 |
| 1,194,603 | Determan | Aug. 15, 1916 |
| 1,218,125 | Sharples | Mar. 6, 1917 |
| 1,222,826 | Warren | Apr. 17, 1917 |
| 1,240,765 | Norris | Sept. 18, 1917 |
| 1,261,780 | Dinesen | Apr. 9, 1918 |
| 1,307,539 | Dinesen | June 24, 1919 |
| 1,349,441 | Shippert | Aug. 10, 1920 |
| 1,538,735 | Oden | May 19, 1925 |
| 1,893,257 | Warren | Jan. 3, 1933 |
| 2,371,803 | Cleverly | Mar. 20, 1945 |

FOREIGN PATENTS

| | | |
|---|---|---|
| 30,389 | Australia | Dec. 3, 1931 |